United States Patent [19]

Fink

[11] 3,913,829

[45] Oct. 21, 1975

[54] ECONOMIC DISPATCH TECHNIQUE FOR INTERCONNECTED POWER SYSTEMS

[76] Inventor: Lester H. Fink, 11304 Full Cry Court, Oakton, Va. 22124

[22] Filed: May 29, 1974

[21] Appl. No.: 474,262

Related U.S. Application Data

[63] Continuation of Ser. No. 293,010, Sept. 28, 1972, abandoned.

[52] U.S. Cl. .................. 235/151.21; 307/57; 444/1

[51] Int. Cl.$^2$. G06F 15/56; G06F 15/06; H02J 3/06

[58] Field of Search ...... 235/151.21; 444/1; 307/57, 307/29, 31–35

[56] References Cited

UNITED STATES PATENTS

| | | | |
|---|---|---|---|
| 3,117,221 | 1/1964 | Kirchmayer | 235/151.21 X |
| 3,124,699 | 3/1964 | Kirchmayer | 307/57 |
| 3,229,110 | 1/1966 | Kleinbach et al. | 235/151.21 X |
| 3,270,209 | 8/1966 | Cohn | 235/151.21 X |
| 3,400,258 | 9/1968 | Stadlin | 235/151.21 |
| 3,683,161 | 8/1972 | Stadlin et al. | 235/151.21 |

*Primary Examiner*—Joseph F. Ruggiero
*Attorney, Agent, or Firm*—Paul & Paul

[57] ABSTRACT

A control system for computing economic dispatch signals for each operating area within an interconnected power system, utilizing an algorithm for solving the interarea coordination equations resulting in the definition of a common reference running cost for the interconnection, and enabling the explicit solving of the individual operating area running costs, thus avoiding any need for an iterative solution. The computational burden is shared between a system computer which makes periodic power and/or running cost assignments for each operating area, and operating area computers which independently calculate specific dispatch signals for the generators within their areas.

10 Claims, 5 Drawing Figures

ECONOMIC DISPATCH TECHNIQUE FOR INTERCONNECTED POWER SYSTEMS

This is a continuation of application Ser. No. 293,010, filed Sept. 28, 1972, now abandoned.

BACKGROUND OF THE INVENTION

A. Field of the Invention

This invention lies in the field of computer controlled interconnected power systems and more particularly in the field of interconnected power systems wherein there is provided explicit periodic calculation of dispatch signals for each operating area within the interconnected system, based upon the tie line flow of power between the areas and the power generation within each such area.

B. Description of the Prior Art

Electric power generating systems generally are comprised of a plurality of generating units of differing efficiencies and having differing absolute and incremental costs of power generated. Generally speaking, systems are comprised of operating areas, each of which is a generating system network within the larger system. An interconnection, or pool, as used herein, is a group of such discrete operating areas, interconnected for economic operation. A control area, as used herein, is an operating area or interconnection of operating areas which maintains the net flow of power across its boundaries at or near a scheduled value which is usually revised periodically. Depending upon the contractual relationship, an interconnection may comprise one or a number of constituent control areas. Within any given control area, generating units are regulated by a load dispatch system so as to match system generation with system load on an economic basis.

In the operation of such interconnected systems, it is of course desirable to optimize system stability and minimize uneconomic response, particularly from non-regulatory units. A copending application filed by the same inventor, U.S. Ser. No. 163,894, filed July 19, 1971 and titled "COMPUTER CONTROLLED CO-ORDINATION OF REGULATION AND ECONOMIC DISPATCH IN POWER SYSTEMS," sets forth an improved control system for achieving the above objectives. In both prior systems and the above improved system, frequency and tie line power flow for a control area are continuously monitored and compared with scheduled frequency and tie line flow, respective differences being combined to produce an error signal, called "area control error" or ACE signal, representing the difference between generation and load. In the improved control system, the ACE signals are combined with a summation of telemetered actual generation signals and supplied to an incremental cost computer which generates therefrom a calculated cost signal that is converted to a generation control signal and transmitted to respective economic generating units.

The incremental cost computer of the referenced system, which describes the operation of an interconnection like the Pennsylvania-New Jersey-Maryland interconnection, periodically makes a detailed dispatch calculation. This is an iterative calculation which references the incremental cost of every generator within the interconnected system to a common reference buss, the iteration being continued until all incremental costs are equal with respect to the reference buss. This calculation determines the incremental cost, or lambda ($\lambda$), of delivered power for the entire system and for each company (or economic unit) in the interconnected system, from which ratios of the respective company lambdas to the system lambda are also calculated. The system lambda is then modified by the respective ratios before being transmitted to the member companies. Algorithms for the iterative dispatch calculations are well known in the art and are in general use in power interconnection control systems.

In the above prior art systems, each sub-area company, after receiving a $\lambda$ signal, recalculates its own economic dispatch signals, on the basis of its own system model, not taking into account the entire system. Consequently, there develop discrepancies between such sub-area calculations which impair the accuracy of the economic dispatch. Also, as a result of the lengthy nature of the complete area dispatch, it may be expected that the calculation of the lambda ratios will be made relatively infrequently (every 5 or 10 minutes) because of the penalty in computer usage for essentially redundant calculations. In the interval between such calculations, the accuracy of the lambda ratios decreases, due to changing system conditions. Further, in recalculating the economic dispatch functions for each sub-area, the non-linearity of the local incremental cost curve aggravates any error in the system lambda.

Due to the low incremental cost and large size of most generating units, the system incremental cost curves are characterized by flat sections covering large blocks of energy combined with much steeper sections toward the upper end of the curve. At the same time, most steam units respond sluggishly at best to an incremental cost signal. This combination of circumstances makes it all but impossible for the system to reset, or compensate the previously calculated lambda value, and the presumed system lambda can rapidly become so inaccurate as to be unstable.

It is to be noted that without considering transmission costs, all lambdas of the constituent companies, or sub-areas within the interconnected system, are made equal in order to minimize overall cost. However, because of transmission costs, the different companies do in fact have different lambdas at which they deliver power. In view of such transmission costs, it becomes desirable that the incremental cost of power delivered to the load, for any two or more generating units within the system, have the same incremental costs. However, for interconnected systems, the expense of power delivery to a boundary between sub-areas, e.g., from one company to another, represents the cost paid by the receiving company, or the cost of delivering to an economic load. Thus, the controlling criterion should be that the interchange incremental power costs, being the delivery costs, be the same for all sub-areas, and be minimized. This criterion also has the advantage of simplifying accounting procedures, since billing is done on the basis of average interchange power between companies. The system and method as disclosed in this application adopt this criterion, and utilize a unique algorithm for explicit computer calculation of optimum system and sub-area running costs.

SUMMARY OF THE INVENTION

It is the primary object of this invention to provide a method and means for enabling computer controlled economic dispatch for an interconnected power system wherein the dispatch signals are solved for explicitly in terms of tie line flow between the sub-areas and power generation within each area, and individual generation signals for the separate control sub-areas (companies) within the interconnection are calculated and transmitted to such companies.

It is another object of this invention to provide a computer controlled technique for calculating economic dispatch for an interconnected power system which is quicker than prior art systems, optimizes computer usage, and enables more frequent calculation of the dispatch so as to avoid the errors of slower prior art systems.

It is another object of this invention to provide a system and method for minimizing the overall computational burden in calculating economic dispatch for an interconnected power system, and in which the computational burden is shared more evenly and without duplication between an interconnection computer and each of a plurality of company, or sub-area computers, with direct control of generation retained at the control area level.

It is another object of this invention to provide a computer controlled technique for determining economic dispatch for an interconnected power system wherein the effect of variations in the slope of the effective interconnected system incremental cost curve are minimized.

It is a further object of this invention to provide a computer controlled technique for economic dispatch of an interconnected power system wherein interchange incremental power costs are equalized and average incremental interchange power cost is minimized.

It is a further object of this invention to provide a computer controlled economic dispatch technique for an interconnected power system wherein overall production costs, including transmission costs, are minimized, and which permits each member company to follow its own dispatch procedures independently of the control system procedure.

It is a yet further object of this invention to provide an economic dispatch technique for an interconnected power system wherein the average cost of power delivered to inter-company (sub-area) ties is minimized, and such average cost is made available for accounting charges between respective companies within the interconnection.

It is still a futher object of this invention to provide a technique for computing economic dispatch for an interconnected power system, wherein there is obtained a common reference running cost for the tie connections of the system.

In accordance with the above objectives, there is provided a computer controlled system of computing the economic dispatch for an interconnected power system comprised of a plurality of sub-areas, and utilizing a solution algorithm for such computation which is in closed form rather than iterative form, thereby providing an explicit solution of the dispatch algorithm based on recently observed values of tie line flow between sub-areas and power generation within each sub-area. The novel algorithm of this system adopts the classical technique for minimizing a function (overall production cost) subject to specified constraints, except that additional constraint equations for the power flow in the tie lines between sub-areas are included in the derivation of the dispatch values. Such additional equations permit the definition of a common reference running cost for the interconnection, allowing the explicit solution of individual sub-area running costs. The procedure for making the economic dispatch calculations is as follows:

1. Each member company transmits, to a central computer which makes the interconnection dispatch calculation, at least that portion of its effective incremental cost curve within a specified band of its current load, in effect providing the interconnection with a linearization of each company's effective incremental cost function about such current operating point.

2. The interconnection system computer adjusts each member company cost curve by means of a compensation factor for such company, which factor incorporates transmission cost data, and then combines the adjusted cost curves to get a total interconnection system cost curve. The compensation factor for each company is obtained by the unique algorithm which allows explicit determination. The terms particular to each company which are required to calculate the compensation factors are transmitted from each such company to the interconnection computer along with the incremental cost curve information, at each periodic calculation of the economic dispatch signals.

3. The interconnection system computer determines an overall (reference) incremental cost, or system running cost, by comparing the current total interconnection system load (as determined from the ACE and total generation signals) with the combined adjusted system curve. The power (megawatt) load that should be carried by each company is determined by comparing the system running cost with the adjusted cost curve for each such company, thus obtaining the assigned load. The assigned load is then transmitted to the company, which then independently calculates the amount of load to be carried by each of its generators.

4. For any company within the interconnection system whose dispatch system is predicted on a running cost (lambda) signal, and which cannot accept a power signal, the interconnection system computer determines the company lambda by dividing the system running cost by the company compensation factor, and transmits the desired lambda signal with the assurance that the signal thus supplied reflects true running cost.

DESCRIPTION OF THE PREFERRED EMBODIMENT

Figure 1:
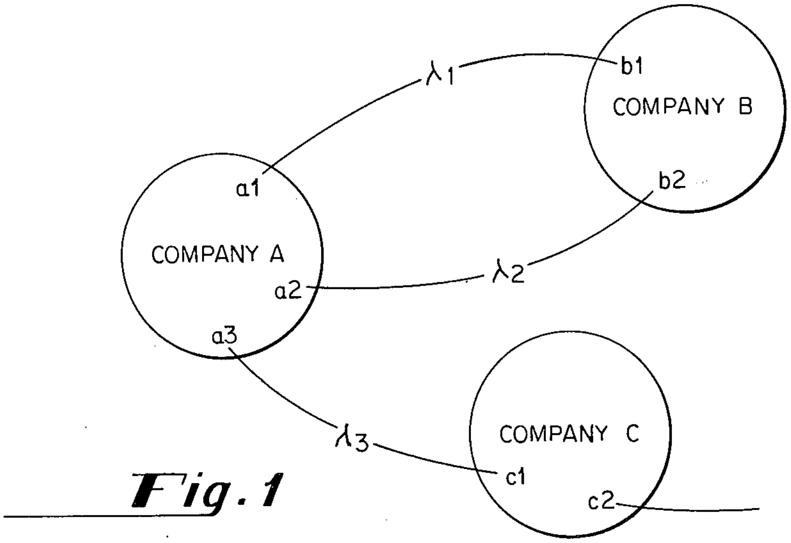
FIG. 1 is an illustration of an interconnected system constituting one control area, and having three interconnected companies (sub-areas), with tie lines indicated.

The discussion which follows will be based on the illustration of a three-company pool, as shown in FIG. 1.

The three companies are illustrated as companies A, B and C, there being two tie lines between company A and company B, and a single tie line between company A and company C. The first tie line between company A and company B is from terminal $a1$ to terminal $b1$ with the power flowing across such tie line having an incremental cost lambda of $\lambda_1$. The second tie line from company A to company B is from terminal $a2$ to terminal $b2$, having a lambda designated as $\lambda_2$. The tie line between company A and company C is between terminals $a3$ and $c1$, having a lambda designated as $\lambda_3$.

Several definitions are helpful at this point. Where the term computer is used, it is to be understood as meaning a general purpose digital computer having a stored program. Also, it is considered that standard in-out peripheral equipment is utilized, for receiving and transmitting data to and from the computers. Also, as used herein, "interconnected system" and "pool" are synonymous, as are "company," "operating area," and "sub-area." Thus, an interconnected system, or pool, refers to a plurality of companies, operating areas or sub-areas which are interconnected by tie lines over which power may be passed from one company to another.

Figure 2:
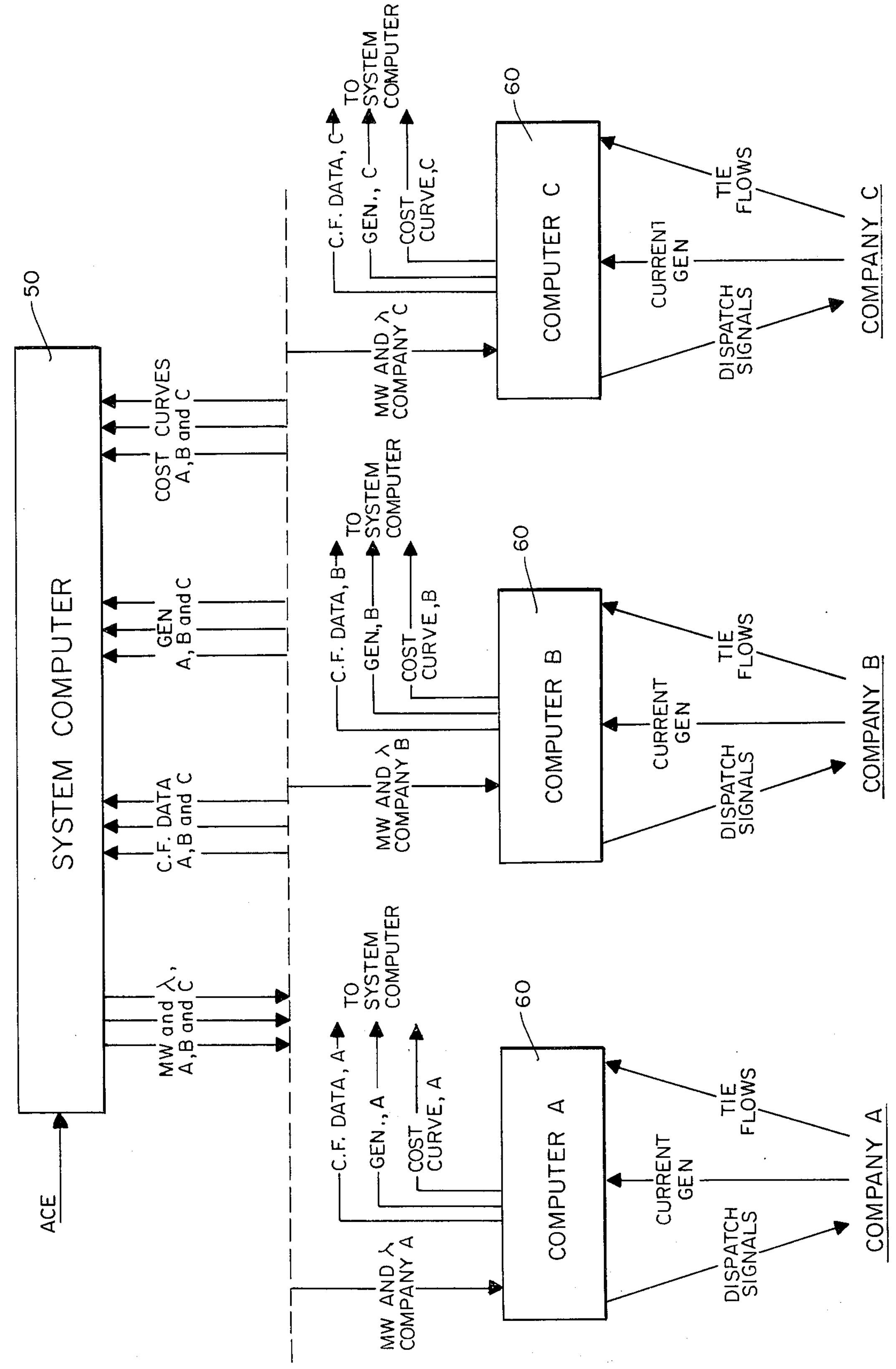
FIG. 2 is a block diagram which shows the flow of information to and from the computers utilized in the system of this invention, for an interconnection system having three member companies.

Referring now to FIG. 2, there is shown a combined block diagram and information flow diagram for the interconnection system of this invention. A system computer 50, typically a general purpose digital computer with a stored program and with facility for periodically receiving input data, carries out the mathematical functions directed by the unique algorithm of this invention. Associated with each company there is a computer 60, such that for the three company illustration there is a computer A associated with company A, a computer B associated with company B, and a computer C associated with company C. Each company computer has a stored program for making independent dispatch calculations for controlling the generators within its company, such calculation being based upon a megawatt or running cost ($\lambda$) signal calculated for it by the system computer 50. Cost curve information for a given company is stored in its respective company computer, for periodic transmission to the system computer 50. It is to be noted that such cost curve information must be periodically updated, as by re-calculation, to account for varying conditions (as when a generator is taken on or off line). Alternately, the cost curve data for each member company may be stored and/or calculated in system computer 50, if it has sufficient capacity. The method of making such cost curve calculations is well known in the art.

Figure 4:
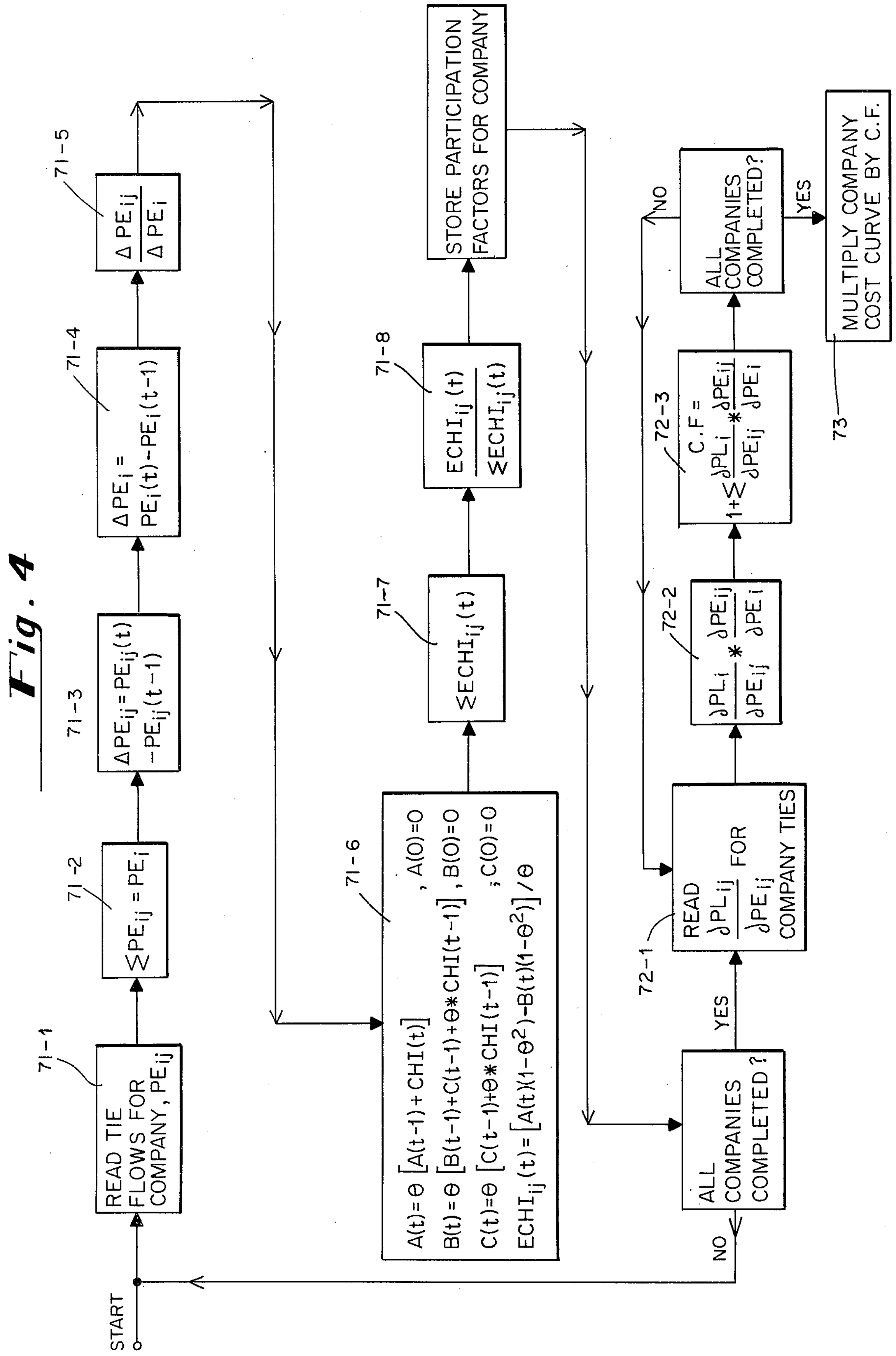
FIG. 4 is a flow diagram illustrating detailed steps in calculating the participation factors and compensation factors.

Each company computer is connected, through conventional transmission links to specific data points of such company, as shown in more detail in FIG. 4, and obtains periodically sample values of current load and tie flows. Each company computer 60 periodically transmits to system computer 50 the following data:

a. Compensation factor (C.F.) data, comprising tie flow information from the company, as well as the incremental transmission losses for the tie lines. Incremental transmission loss data is stored in each company computer, and the incremental transmittal loss is determined for the then sampled value of each tie line, and transmitted to the system computer.

b. Generation date. Each computer 60 makes a summation of total company generation, which summation is transmitted to system computer 50.

c. Cost curve data. For the current generation of each company, each computer 60 transmits a portion of its stored company cost curve centered about such current generation level.

System computer 50 is illustrated to receive C.F. data, generation data and cost curve data from the companies, which data is receives periodically at a rate which is optimized in view of system parameters, e.g., rate of change of load. The system computer makes periodic calculations of the running cost, or $\lambda_R$, and company running costs, and transmits either a running cost signal or a corresponding megawatt (MW) signal, or both, to each company computer 60. Computer 60 in turn makes an independent calculation, based upon the signal it has received, of dispatch signals which are assigned to each generating unit within its company. Such independent company calculations may be made in any known way, and the specifics of such company calculations as such do not form a part of this invention. It is important to note, however, that each company may use its own technique for dispatching power generation assignments within its own boundaries.

The classical solution to the basic (unitary area) dispatch problem is obtained by formulating economic dispatch as a parameter optimization problem with equality constraints. In the system of this invention, I take this same approach to the compound area (multi-company) problem, introducing only slight modifications into the usual mathematical development, but arriving at a new algorithm.

In the course of the development hereinbelow, the following assumptions are made:

A. All the functions used in the development are continuous functions of time.

B. In addition, the composite, effective incremental cost functions of the (three) individual member companies are monotonically increasing functions of total generation.

C. The only sources of power injection into any one company area are that company's own generating units and the tie lines connecting it to other areas.

D. The solution to the problem of system control (i.e., overall economic dispatch of the entire compound area) comprises the solutions to the problems of the several local control areas (i.e., the economic dispatches of the several member companies).

The solution is begun in the usual manner by defining a function $$H \triangleq F + \underline{\lambda}'\underline{f}$$

where $F$ represents the total cost of generation $\underline{f}$ represents a set of constraint equations and $\underline{\lambda}$ represents a set of undetermined coefficients (the Lagrange multipliers).

For each area there is a constraint equation $$f_i = PD_i + PL_i + (\overset{l}{\Sigma} PE_j)i - PG_i = 0$$

where $PD_i$ represents the power delivered to the load in company $i$, $PL_i$ represents the transmission losses within company $i$, $PE_j$ represents the power exported from company $i$ over one of the $l$ tie lines having one terminal in company $i$, and $PG_i$ represents the power generated within company $i$ $$= (\overset{m}{\Sigma} PG_k)_i$$

for the $m$ generating units in company $i$.

In addition, there are $n$ additional constraint equations for the $n$ inter-member-company tie lines, $$f_j = (PE_j)_i + (PE_j)_k = 0,\ i \neq k$$

which constrains the power into one terminal of a tie-line to equal the power out of the other terminal. This set of constraint equations enables treatment of the $2n$ tie-line terminals as independent power sinks in the several companies. (In forming H it is convenient to add the $f_i$ and subtract the $f_j$.)

With these constraint equations, the vector $\underline{\lambda}$ becomes, for the example case, $$\underline{\lambda}^t = (\lambda_a, \lambda_b, \lambda_c, \lambda_{R1}, \lambda_{R2}, \lambda_{R3})$$

Given assumption B, the conditions for economic dispatch (which are the necessary conditions for a stationary value of F subject to the indicated constraints) are provided by A. The $(n + 3)$ constraint equations themselves;

B. The (three) partial derivatives of H with respect to $PG_a$, $PG_b$, $PG_c$. Of course, H could be written in terms of, and differentiated with respect to, the power generated by all the individual machines within the interconnection, thus yielding simultaneously the conventional conditions for economic dispatch within each company; and C. The $(2n)$ partial derivatives of H with respect to the power delivered to the several tie terminals.

There are thus $(n + 3) + 3 + 2n = 3n + 6$ equations with $3n + 6$ unknowns. It is important to note, since tie flows are treated as independent variables, in differentiating H with respect to generation, that under assumption C, the transmission losses in any one area are not a function of the generation in any other area.

In order to minimize F subject to the constraint vector $f$, the following set of homogeneous partial differential equations are solved:

$$\frac{\delta H}{PG_i} = 0$$

$$\frac{\delta H}{PE_j} = 0$$

For the illustrated system, we have $$H = F + \lambda_a f_a + \lambda_b f_b + \lambda_c f_c - \lambda_1 f_1 - \lambda_2 f_2 - \lambda_3 f_3$$

(a) $f_a = PD_a + PL_a + (PE_{a1} + PE_{a2} + PE_{a3}) - PG_a = 0$ $$f_b = PD_b + PL_b + (PE_{b1} + PE_{b2}) - PG_b = 0$$
$$f_c = PD_c + PL_c + (PE_{c1}) - PG_c = 0$$
$$f_1 = PE_{a1} + PE_{b1} = 0$$
$$f_2 = PE_{a2} + PE_{b2} = 0$$
$$f_3 = PE_{a3} + PE_{c1} = 0$$

(b)

$$\frac{\delta H}{\delta PG_a} = \frac{\delta F_a}{\delta PG_a} + \lambda a\ \frac{\delta PL_a}{\delta PG_a} - \lambda_a$$

$$\frac{\delta H}{\delta PG_b} = \frac{\delta F_b}{\delta PG_b} + \lambda b\ \frac{\delta PL_b}{\delta PG_b} - \lambda_b$$

$$\frac{\delta H}{\delta PG_c} = \frac{\delta F_c}{\delta PG_c} + \lambda c\ \frac{\delta PL_c}{\delta PG_c} - \lambda_c$$

(c) For Company A, $$\frac{\delta H}{\delta PE_{a1}} = \lambda a + \lambda a\ \frac{\delta Pl_a}{\delta PE_{a1}} - \lambda_1 = 0, \text{ or}$$

$$\lambda_1 = \lambda_a \left(1 + \frac{\delta PL_a}{\delta PE_{a1}}\right)$$

$$\frac{\delta H}{\delta PE_{a2}} = \lambda_a + \lambda_a\ \frac{\delta PL_a}{\delta PE_{a2}} - \lambda_2 = 0, \text{ or}$$

$$\lambda_2 = \lambda_a \left(1 + \frac{\delta PL_a}{\delta PE_{a2}}\right)$$

$$\frac{\delta H}{\delta PE_{a3}} = \lambda_a + \lambda_a\ \frac{\delta PL_a}{\delta PE_{a3}} - \lambda_3 = 0, \text{ or}$$

$$\lambda_3 = \lambda_a \left(1 + \frac{\delta PL_a}{\delta PE_{a3}}\right)$$

For Company B, $$\frac{\delta H}{\delta PE_{b1}} = \lambda_b \left(\frac{\delta PL_b}{\delta PE_{b1}}\right) + \lambda_b - \lambda_1 = 0, \text{ or}$$

$$\lambda_1 = \lambda_b \left(1 + \frac{\delta PL_b}{\delta PE_{b1}}\right)$$

$$\frac{\delta H}{\delta PE_{b2}} = \lambda_b + \lambda_b \left(\frac{\delta PL_b}{\delta PL_{b2}}\right) - \lambda_2 = 0, \text{ or}$$

$$\lambda_2 = \lambda_b \left(1 + \frac{\delta PL_b}{\delta PL_{b2}}\right)$$

$$\frac{\delta H}{\delta PE_{c1}} = \lambda_c \left(\frac{\delta PL_c}{\delta PE_{c1}}\right) + \lambda_c - \lambda_3 = 0, \text{ or}$$

$$\lambda_3 = \lambda_c \left(1 + \frac{\delta PL_c}{\delta PE_{c1}}\right)$$

Inspection of the equation set shows that the multipliers associated with the (first three) constraint equations $f_i$, above, represent the conventional effective incremental cost of power delivered to their own load from their own generation in each of the (three) companies, while the remaining $(n)$ multipliers represent the effective incremental cost of power delivered to the several tie-lines.

The (three) equations (b) are independent and individually yield the usual intra-company penalty factors $$\lambda_i = \frac{dF_i}{dG_i} \Big/ \left(1 - \frac{\delta PL_i}{\delta PG_i}\right)$$

At this juncture, consideration of an operating requirement simplifies the problem and facilitates further analysis. In order for member companies of a pool to benefit mutually from the economies achieved through overall economic dispatch, an equitable method for sharing those savings is required. Since the flow of power across individual ties cannot readily be controlled, the usual methods for pricing interchanged power are based on the average incremental cost of power at the boundaries of a given company. Accordingly, it is reasonable to adopt as an additional criterion for economic dispatch the requirement that the average incremental cost of power at the boundaries of the several member companies be equal. This criterion is in accordance with, but is not required by, assumption D.

We can now calculate such average incremental costs of power at the boundaries. A weighted average incremental cost, $\lambda_R$, is calculated as shown below, it being noted that the sum of the partials for each company equals 1. For the 3 company case illustrated, in area A $$\lambda_1 \frac{\delta PE_{a1}}{\delta PE_a} + \lambda_2 \frac{\delta PE_{a2}}{\delta PE_a} + \lambda_3 \frac{\delta PE_{a3}}{\delta PE_a} = \lambda_R$$

in area B $$\lambda_1 \frac{\delta PE_{b1}}{\delta PE_b} + \lambda_2 \frac{\delta PE_{b2}}{\delta PE_b} = \lambda_R$$

and in area C $$\lambda_3 \frac{\delta PE_{c1}}{\delta PE_c} = \lambda_3 = \lambda_R ,$$

since, in the case of company C, power exported outside the pool, or interconnection system, is not to be considered. From the above, it is seen that while the incremental cost of power delivered across the different tie lines ($\lambda_1$, $\lambda_2$, $\lambda_3$) differs, the weighted average tie flow incremental cost for each area is constrained to be equal to a common reference lambda, $\lambda_R$. The partials of the individual tie flows with respect to net tie flow represent participation factors which can be obtained as shown below.

Substituting in these expressions for average incremental costs at the boundaries the expressions for individual incremental costs at the ties given by equations (c), we have for area A $$\lambda_a \left[ \left(1 + \frac{\delta PL_a}{\delta PE_{a1}}\right) \frac{\delta PE_{a1}}{\delta PE_a} + \left(1 + \frac{\delta PL_a}{\delta PE_{a2}}\right) \frac{\delta PE_{a2}}{\delta PE_a} + \left(1 + \frac{\delta PL_a}{\delta PE_{a3}}\right) \frac{\delta PE_{a3}}{\delta PE_a} \right] = \lambda_R .$$

Rearranging, and recognizing that the participation factors for any one company must add to unity, we have $$\lambda_a \left(1 + \frac{\delta PL_a}{\delta PE_a}\right) = \lambda_R ;\ \lambda_a * CF_a = \lambda_R$$

$$\lambda_b \left(1 + \frac{\delta PL_b}{\delta PE_b}\right) = \lambda_R ;\ \lambda_b * CF_b = \lambda_R$$

$$\lambda_c \left(1 + \frac{\delta PL_c}{\delta PE_c}\right) = \lambda_R ;\ \lambda_c * CF_b = \lambda_R .$$

It is interesting to note that the same set of relationships are obtained if, instead of imposing constraints $f_j$ as shown above, on the individual ties, there had been imposed one constraint on the sum of all the tie flows, which would be a constraint on the sum of the net tie flows. Thus, for the three company illustration, the fourth constraint equation would be $f_R = PE_a + PE_b + PE_c = 0$. In such case, the one associated multiplier ($\lambda_R$) turns out to be identical with the common average incremental cost at the boundaries, as defined above.

Figure 3:
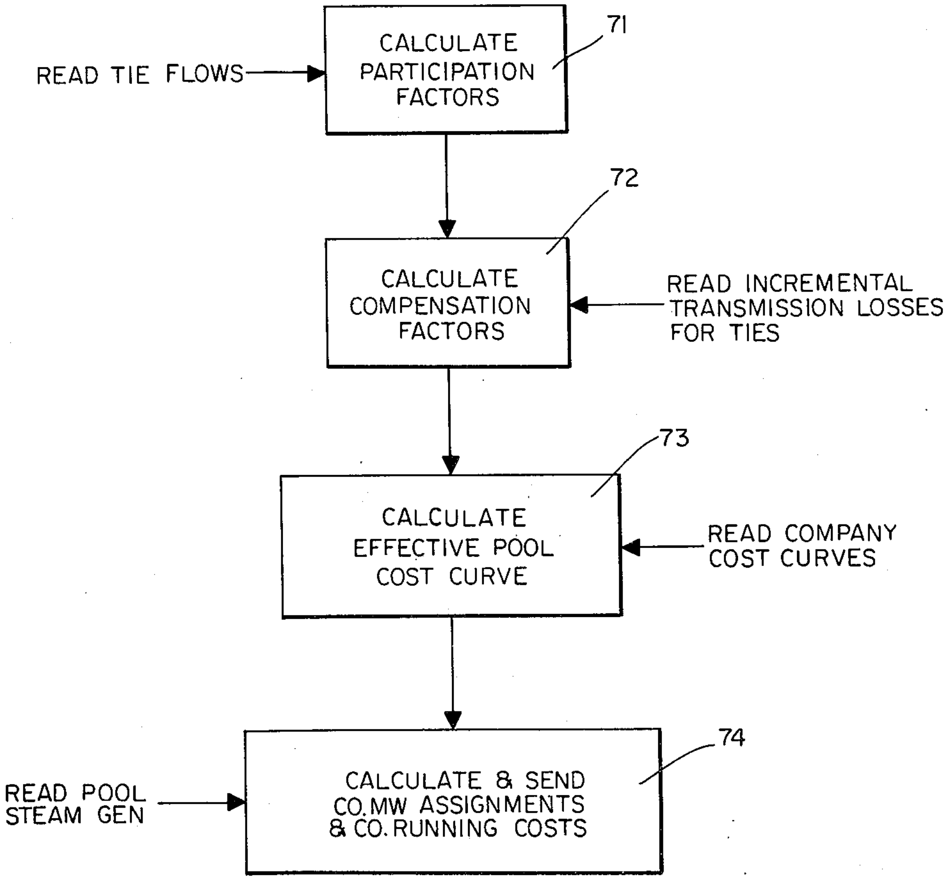
FIG. 3 is a flow diagram illustrating the steps in calculating power assignments and running costs for companies within the interconnection system.

Referring now to FIGS. 3 and 4, there are shown in block diagram form the primary calculation steps in solving for the final dispatch signals. Each of the four steps illustrated in FIG. 3 is outlined further hereinbelow, and with sufficient detail to allow a programmer of ordinary skill in the art to program such calculations on a general purpose digital computer having a stored program. Steps 71 and 72 are illustrated in detail in FIG. 4; steps 73 and 74 involve standard computer operations well known in the art.

71. Calculate participation factors.

For each company (company A is illustrated):

1. Read the tie flows: $PE_{a1}$, $PE_{a2}$, $PE_{a3}$
2. Sum the tie flows to form the net tie flow:
$PE_a = PE_{a1} + PE_{a2} + PE_{a3}$
3. For each such tie, take the difference between the current tie flow and the next most recent tie flow, to obtain the change in tie flow:
$PE_{a1}(t) - PE_{a1}(t-1) = \Delta PE_{al}$;
$PE_{a2}(t) - PE_{a2}(t-1) = \Delta PE_{a2}$;
$PE_{a3}(t) - PE_{a3}(t-1) = \Delta PE_{a2}$.
4. Take the difference between the current net tie flow and the next most recent net tie flow to give the change in net tie flow:
$PE_a(t) - PE_a(t-1) = \Delta PE_a$
5. For each tie, divide the change in tie flow by the change in net tie flow, to give the per unit change in tie flow defined as $CHI(t)$:

$$CHI_a(t) \equiv \frac{\Delta PE_a}{\Delta PE_a},$$

for tie $j$ in company A.

6. Filter the per unit changes recursively, for each tie, by solving the following set of equations, thereby obtaining an estimated per unit change in tie flow defined in $ECHI(t)$:

$$A(t) \equiv \theta\,[A(t-1) + CHI(t)] \quad A(O) = 0$$
$$B(t) \equiv \theta\,[B(t-1) + C(t-1) + \theta * CHI(t-1)] \quad B(O) = 0$$
$$C(t) \equiv \theta\,[C(t-1) + \theta * CHI(t-1)] \quad C(O) = 0$$
$$ECHI_{aj}(t) \equiv [A(t)\,(l - \theta^2) - B(t)\,(1 - \theta^2)]/\theta$$

$ECHI(t)$ is calculated, from the above cited equations, for each tie line in each company. The value of $\theta$, as used in these equations, is a fraction of about 0.98, picked empirically from test runs. It is to be noted that this is one manner of obtaining the estimated CHI function, or ECHI(t), and that alternate means of estimating can be used.

7. Sum the filtered per unit changes in tie flows:

$$\sum_{J=1}^{J=3} ECHI_{aj}(t) = ECHI_{a1}(t) + ECHI_{a2}(t) + ECHI_{a3}(t)$$

8. Calculate the participation factor for each tie line interconnecting the given area (A) by dividing filtered per unit changes in the tie flows by the sum of the filtered per unit changes:

$$P.F.\Big|_{aj} = \frac{\delta PE_{aj}}{\delta PE_a} = \frac{ECHI_{aj}(t)}{\Sigma ECHI_{aj}(t)}$$

The above procedure is then repeated for each area (company) within the interconnection system.

72. Calculate compensation factors for each company.

1. Read into the system computer the incremental transmission losses $$\left(\frac{\delta PL_i}{\delta PE_{ii}}\right)$$

for the tie lines, either from on-line load flow or from the B-matrix. The procedure for utilizing either on-line flow or the B-matrix is well known in the art. If on-line load flow is used, the incremental transmission losses are obtained directly. If the B-matrix constants are used, then the system computer derives the transmission losses from the matrix constants. See, for example, O. I. Elgerd: Electric Energy Systems Theory, McGraw Hill, N.Y., 1971, pp. 294–299, relating to on-line load flow; N. Cohn: Control of Generation and Power Flow on Interconnected Systems, Wiley, N.Y., 1966, pp. 71–78, relating to the B-matrix technique.

2. For each tie line within an area, multiply the incremental transmission loss for that tie by the participation factor for that tie, and take the summation of all ties at the boundary of such company, to yield a weighted average incremental net tie flow transmission loss for such company.

3. Calculate the compensation factor for each such company by adding unity plus the incremental net tie flow transmission loss for that company.

73. Calculate the effective interconnection system (pool) cost curve.

1. Read into the system computer the incremental cost curves for the member companies, as transmitted from the respective member company computers. It is to be noted that such curves are transmitted in digital form, i.e., a series of data points. For each company, the data is read in within a range (e.g., 10 MW) around the current operation point. It is assumed that available power is limited to such range, and the company will not be asked to deliver power outside of the range.

2. Multiply the company incremental cost curves by their respective compensation factors, i.e., multiply the incremental cost for each data point on the transmitted company curve by the compensation factor for each company.

3. Determine the minimum and maximum point for each incremental cost curve, and from these determine the most maximum of the maximums and the most minimum of the minimums, which latter values delimit a range of incremental cost, R(λ). Each cost curve having a maximum or minimum within the limits of R(λ) is straight line-projected from such maximum or minimum at a constant MW value.

4. Subdivide R(λ) into an arbitrary number of parts, e.g., 100, and determine the generation available from each company at each such part, or increment.

5. Sum the generation available from all of the companies within the system available at each increment, to yield the composite adjusted curve of total generation available at each cost increment.

74. Calculate company power (MW) assignments and running costs (λ).

1. Read into the system computer generation data from each company, and sum same to obtain a total system generation signal. Read the system ACE (area control error) signal, (and, if necessary, the system variables required to calculate the ACE signal), and add the total system generation signal and the ACE signal to obtain total system load. See the co-pending application, Ser. No. 163,894, of the same inventor, titled COMPUTER CONTROLLED COORDINATION OF REGULATION AND ECONOMIC DISPATCH IN POWER SYSTEMS, for a discussion of this manner of deriving the total system load.

2. From the total adjusted system incremental cost curve, determine the system running cost ($\lambda_R$) corresponding to present system load.

3. From the adjusted company incremental cost curves, determine for each respective company the generation to be made available at the determined running cost, or the assigned generations:

$PG_a$; $PG_b$; $PG_c$

4. Compute the sum of company generation, $\Sigma PG_i$, and compare with the total system load (PD). If the sum of company generation is not equal to such total load, adjust the calculated company generations proportionately. Then, For companies that cannot receive a generation, or megawatt signal, 5. Divide the system running cost ($\lambda_R$) by the respective company compensation factor, to determine the company running cost ($\lambda_i$).

6. Transmit to each such company its assigned running cost.

From the above, it is seen that the component curves for each individual company are accurate only in the neighborhood of the current operating point, i.e., the existing generation and existing actual tie line flows. To the extent that the existing generation does not satisfy the economic dispatch criteria, the solution vector (the company lambdas) obtained by the algorithm will involve coordinates more or less distant from the current operating points of the companies, thus introducing error. However, assumptions A and B, together with sufficiently frequent recourse to the algorithm, will ensure convergence to an accurate solution vector. Each solution of the dispatch algorithm is based on the values of the variables most recently observed or estimated. If the time interval between solutions is small enough, the change in these variables will be within the limits of accuracy of the other data used by the solution.

It will be noted that, as a practical matter, the method and system of this invention will often be applicable only to steam generating units, as hydro units have relatively invarient running costs. For this reason, step 74 (as illustrated in FIG. 3) is shown to include reading the pool steam generation. However, it is to be understood that the invention is generally applicable to all types of generators without limitation, even though in practice certain operating generators may be excluded from control as described herein.

Figure 5:
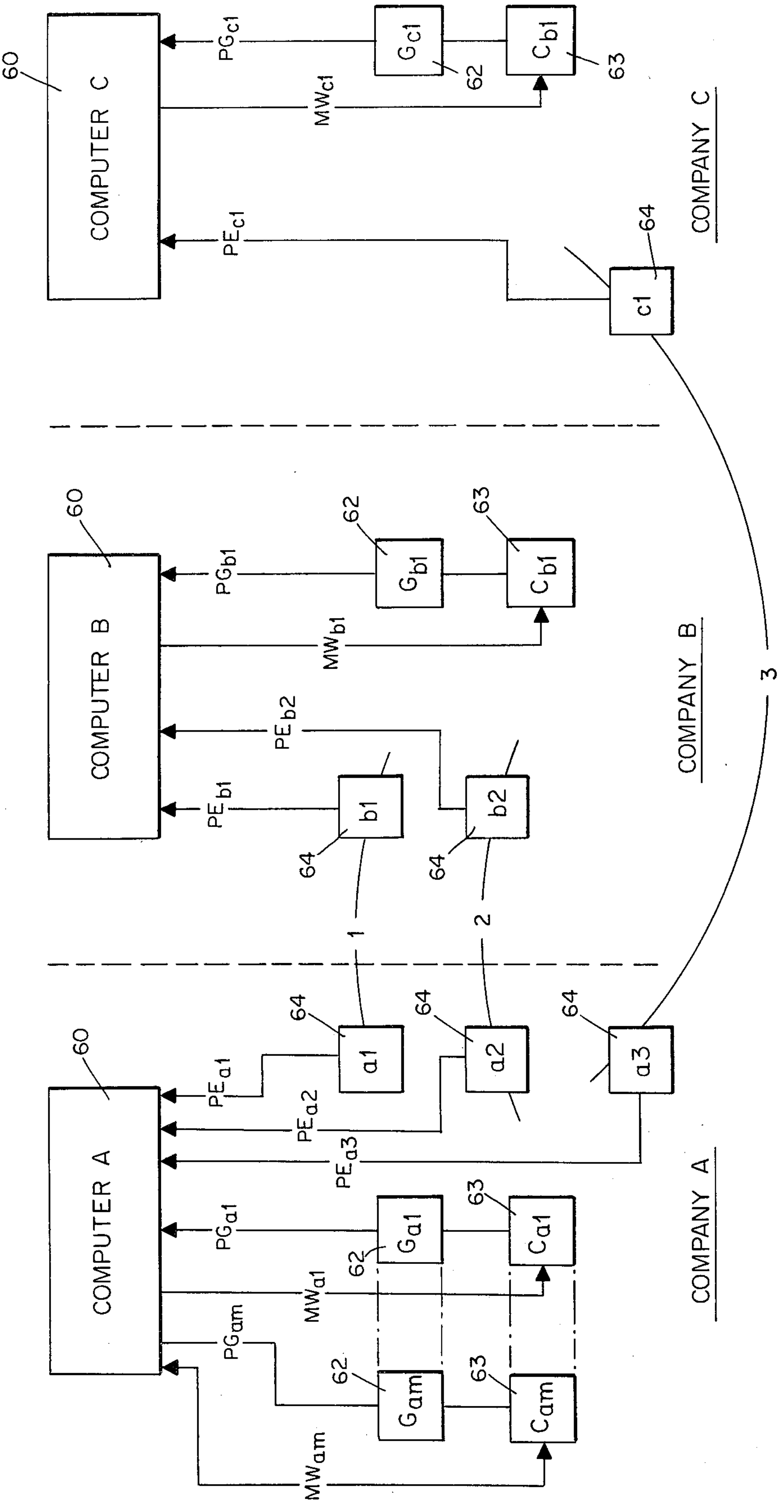
FIG. 5 is a block diagram illustrating the control of generator units at the company level.

Referring now to FIG. 5, there is seen an illustration of means provided for controlling actual generation at the company, or sub-area level. Each generator 62 (designated as $G_{im}$, where *i* represents the company and *m* represents the number of generators in each company) has incorporated thereinto a conventional control unit 63 designated as $C_{im}$, and adapted to receive control signals and to control the power output of the generator 62 in accordance therewith. It is seen that data representing the power output of each generator, as, for example, determined by a wattmeter and translated into digital form by a conventional sampling and A-D equipment, is transmitted to the respective company computer 60. In addition, following the determination of the system dispatch signals by the system computer 50, and transmission of a corresponding company signal back to each company computer 60, each company computer 60 calculates a megawatt signal for each generator 62 within the company, and transmits same to the control device 63. As stated hereinabove, the calculation of the company level dispatch signals may be performed in any prior art manner. Methods of calculating dispatch signals at the company level are well known in the art, and consequently are not set forth in detail here.

FIG. 5 also illustrates the use of devices 64 for determining the tie flows and generating therefrom digital signals in proper condition for transmission to the respective company computers 60. Each device 64 may be a conventional wattmeter, along with a sampling unit, an analog filtering device and an analog to digital converter, for generating periodic representations in digital form of the actual tie flow.

From the above it is seen that there is provided a means and method for periodic explicit calculation of a dispatch control signal, which calculation is based upon equalization and optimization of the running cost of power delivered to the boundaries of each company (or sub-area) within an overall interconnected system. The unique algorithm presented hereinabove is not iterative, but enables speedy computer calculation of the reference system running cost, from which each company computer can make accurate and independent recalculations for dispatch of power generation within its own company. It is to be noted that, once each company is given an assignment (or dispatch signal) optimized in terms of tie flow cost, each company can use its own criteria in dispatching generation within its boundaries, without upsetting the system optimization or the manner of dispatch in the other pool companies.

I claim:

1. An interconnected power system comprising:

a. a plurality of subsystems each having a plurality of power generation units coordinated by a local generation coordination control system for developing generating requirements for said units in response to subsystem generating requirements, said subsystems being interconnected to transmit power among each other;

b. system digital computer means having a stored program for performing, at least at the rate of significant change of subsystem generating conditions, the function of explicitly calculating, for each of said subsystems, a subsystem dispatch signal as a function of power flow within each such subsystem, and c. transmission means for coupling, at least at said rate, status information from said local generation control systems to said system computer means, and for coupling, at least at said rate, corresponding subsystem dispatch signals back to control and to coordinate the operation of said power generation units.

2. An interconnected power system comprising:

a. a plurality of subsystems, each including a plurality of power generating units, said subsystems being interconnected to transmit power among one another;

b. means for sampling current load and tie line flow, for each of said subsystems, at a frequency at least as great as the rate of significant change of said current load and tie line flow quantities;

c. means, responsive to said means for sampling, for explicitly developing for each of said subsystems, at least at said frequency, a subsystem dispatch requirement;

d. a plurality of subsystem control means, corresponding respectively to said subsystems, for developing power generating requirements for the units of the associated subsystem; and e. means for coupling dispatch requirements from said means for developing, at said frequency, the subsystem dispatch requirements to the corresponding subsystem control means.

3. An interconnected power system comprising:

a. a plurality of subsystems, each including a plurality of power generating units, said subsystems being interconnected to transmit power among one another; and b. system control means including:

1. means for sampling prevailing power generating conditions at the subsystem level,
2. principal control means, responsive to the subsystem level conditions from said means for sampling, for explicitly developing, for each of said subsystems, a subsystem dispatch requirement at a rate as least as frequent as substantial system conditions change,
3. a plurality of subsystem control means, corresponding respectively to said subsystems, for developing power generating requirements for the units in the associated subsystem, and
4. means for coupling dispatch requirements from said principal control means to the corresponding subsystem control means at at least said rate.

4. The system as described in claim 1, wherein said computer means performs said function subject to the constraint that the incremental costs of tie flow at the boundaries of each such subsystem are equal.

5. The system as described in claim 4, comprising control means in communication with said computer means, for controlling power generation units within each said subsystem as a function of said subsystem dispatch signals.

6. A system as described in claim 2 wherein said means for explicitly developing comprises computer means for developing a subsystem dispatch requirement subject to the constraint that the incremental cost of tie flow at the boundaries of each subsystem are equal.

7. A system as described in claim 3 wherein said principal control means comprises system digital computer means having a stored program for performing the functions of:

1. calculating participation factors for each tie line of each said subsystem;
2. calculating as a function of said participation factors, compensation factors for each said subsystem;
3. adjusting the incremental cost curve of each such subsystem by its respective compensation factor, and summing said adjusted incremental cost curves to obtain an effective system incremental cost curve;

4. determining the system incremental cost from said effective cost curve for the current system load; and
5. for at least one of said subsystems, determining a generation assignment signal on the basis of the system incremental cost and the adjusted cost curve of such subsystem, said generation assignment signal being a form of economic dispatch signal suitable for regulating the generation of said subsystem.

8. The system as described in claim 7, wherein said computer means performs, for a second one of said subsystem, the function of dividing said system incremental cost by the calculated compensation factor of such second subsystem to determine an incremental cost signal for said second subsystem.

9. The system as described in claim 7 wherein the compensation factor (C.F.) for an operating area (*i*) having N tie lines connected thereto is defined by the relation $$C.F. = \left[\left(1 + \frac{\delta PL_i}{\delta PE_{i1}}\right)\frac{\delta PE_{i1}}{\delta PE_i} + \left(1 + \frac{\delta PL_j}{\delta PE_{i2}}\right)\frac{\delta PE_{i2}}{\delta PE_i} + \ldots + \left(1 + \frac{\delta PL_i}{\delta PE_{iN}}\right)\frac{\delta PE_{iN}}{\delta PE_i}\right].$$

10. The system as described in claim 9, wherein said participation factors are $$\frac{\delta PE_{i1}}{\delta PE_i}, \frac{\delta PE_{i2}}{\delta PE_i}, \ldots, \frac{\delta PE_{iN}}{\delta PE_i},$$

and add to unity.

* * * * *

UNITED STATES PATENT OFFICE
CERTIFICATE OF CORRECTION

Patent No. 3,913,829 Dated October 21, 1975

Inventor(s) Lester H. Fink

It is certified that error appears in the above-identified patent and that said Letters Patent are hereby corrected as shown below:

Column 8, line 5, in the equation, "l" should read --L--.

Column 10, line 28, the equation "$CHI_a(t) \doteq \frac{\Delta PE_a}{\Delta PE_a}$"

should read --$CHI_{aj}(t) \doteq \frac{\Delta PE_{aj}}{\Delta PE_a}$--.

Column 16, line 5, in the equation "j" should read --i--.

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*